Aug. 26, 1958
C. T. JACOBS
2,849,541
MULTIPURPOSE INDICATOR FOR PHONOGRAPHS
Filed June 20, 1956
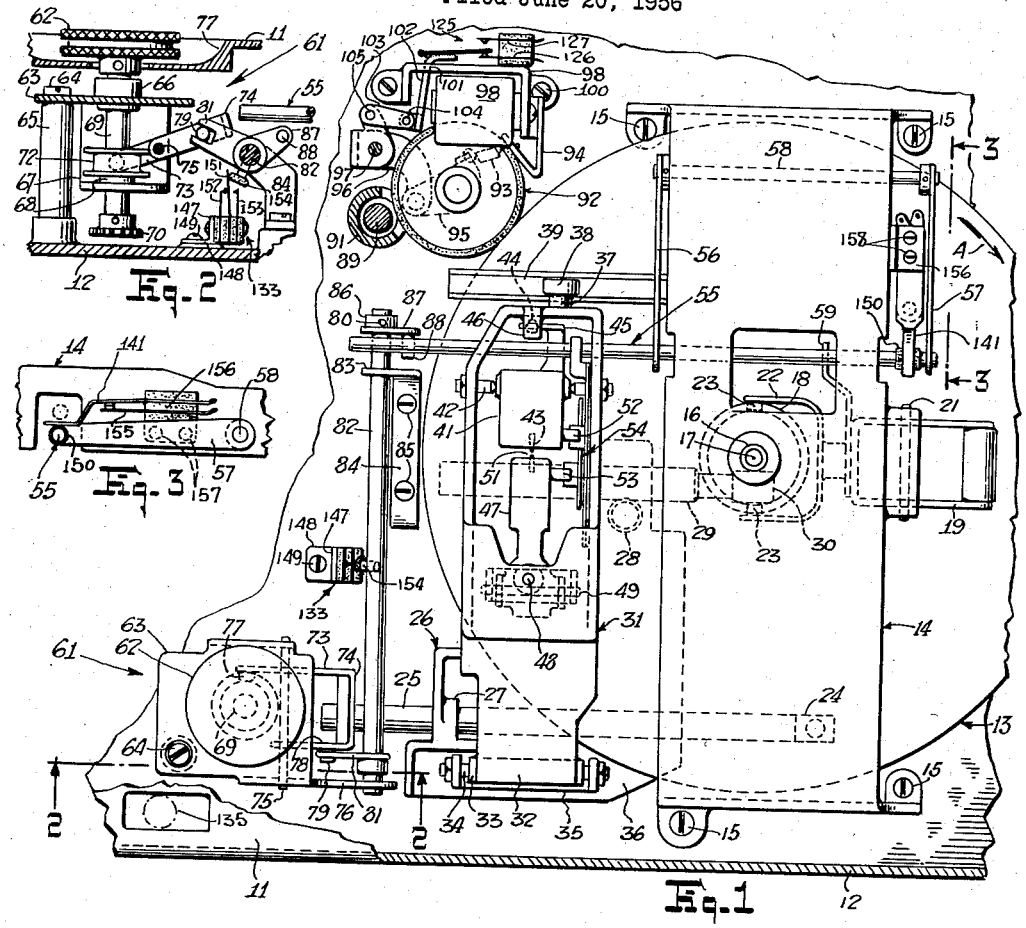
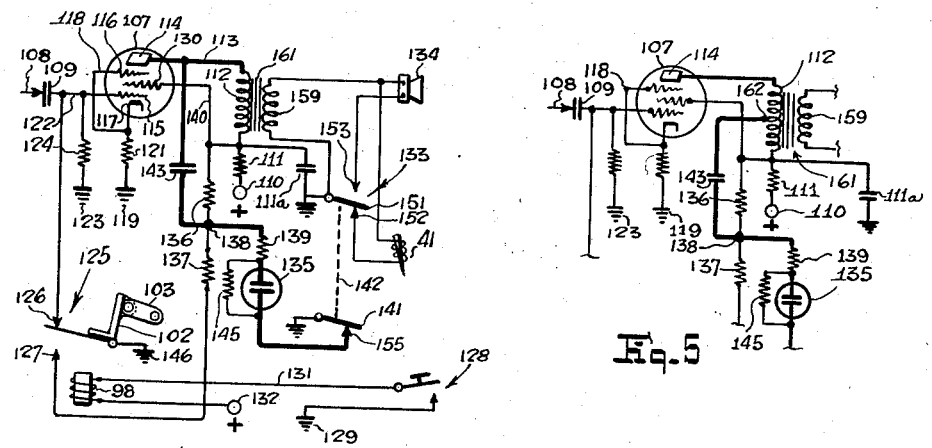
INVENTOR
Charles T. Jacobs
BY George H. Fritzinger
Agt.

United States Patent Office 2,849,541
Patented Aug. 26, 1958

2,849,541

MULTIPURPOSE INDICATOR FOR PHONOGRAPHS

Charles T. Jacobs, Bernardsville, N. J., assignor, by mesne assignments, to McGraw-Edison Company, Elgin, Ill., a corporation of Delaware Application June 20, 1956, Serial No. 592,641

13 Claims. (Cl. 179—100.1)

This invention relates to improvements in machines adapted for recording and reproducing dictation and is herein described in connection with a dictating machine using disc records, but no unnecessary limitation to such a machine is intended.

In using a dictating machine, it is desirable to know when the machine is conditioned for recording—i. e., when the amplifier is hot, when the start-stop switch is effective to engage the clutch, and when the amplified speech-representing oscillations are being recorded. The machine involving the present invention includes a single device which gives an indication to the operator as to the foregoing conditions.

An object of this invention is to provide a signal system for use in connection with a dictating machine, so as to indicate to the dictator whether or not the machine has been placed in condition for recording.

Another object of the invention is to provide a signal lamp in a dictating machine which, by extinguishment from a previously steady illuminated condition in response to the closing of the stop-start switch, shows that the amplifier is hot and that the clutch has been engaged.

A further object of the invention is to provide a signal lamp, which may be one of the neon type, in combination with a dictating machine in order to show by intermittent illumination, in a response to peaks of speech, that the amplified speech-representing oscillations are being applied to the recorder.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views:

Figure 1 is a fragmentary top plan view of a recording and reproducing machine, as seen with the top section of the housing removed and with portions in horizontal section.

Figure 2 is a fragmentary vertical sectional view on the line 2—2 of Figure 1, in the direction of the arrows, with parts shown in elevation.

Figure 3 is a fragmentary vertical sectional view on the line 3—3 of Figure 1, in the direction of the arrows, showing an operating switch and associated parts in elevation.

Figure 4 is a fragmentary wiring diagram.

Figure 5 is a fragmentary wiring diagram, corresponding generally with Figure 4 but illustrating an alternative form of my invention.

The improvement of the present invention is, in a preferred embodiment, incorporated in a dictating machine such as generally disclosed in the Somers application, Serial No. 347,875, filed April 10, 1953, having common ownership with the present application, and to which reference may be made for specific details.

For present purposes, such a machine need be only partially described. It comprises, for instance, two pan-shaped housing members or sections 11 and 12 in inverted relationship to each other and joined mainly on a medial plane of the assembled housing. A turntable 13 is journaled with respect to the lower housing section 12, as by having a tubular shaft journaled on a post upstanding therefrom (not shown). A bridge 14 overlies the turntable 13, diametrically thereof, and is mounted on the lower housing section 12 at its ends, as by being secured thereto by means of screws 15. On this bridge, axially in line with the turntable, is an interior bearing 16 rotatably receiving a plunger rod 17 which carries a record-clamping member 18 at its lower end.

The plunger rod 17 is movable upwardly and downwardly by a transversely-extending U-shaped member 19, which is pivoted to the right side of the bridge 14, as on a cross pin 21. Secured to the inner end of this U-lever is a fork 22 having diametrically opposite pins 23, which engage a peripherally grooved portion of the record-clamping member 18. The U-lever is coupled to a door (not shown) hinged to the top section 11 of the housing and which is openable to provide space for the fingers in mounting and removing a record onto and from the turntable. The coupling between the door and the U-lever 19 is such that the record-clamping member is engaged with and disengaged from the turntable as the door is closed and opened.

On the front portion of the lower housing section 12 there is a pair of standards, one of which is indicated at 24, supporting a front cross rod 25. At about the central portion of the lower housing section, there is a second pair of standards supporting a parallel cross rod (not shown). Mounted slidably on these cross rods is a subcarriage 26. This subcarriage may be formed as a casting having apertured lugs, one of which is shown at 27, slidably embracing the cross rod 25. Carried by the subcarriage is a circular feed nut 28 which meshes with the feed screw 29 of the machine, which is supported at its ends and carries a worm wheel 30 meshing with a worm gear carried by the tubular turntable shaft (not shown).

A main carriage 31 overlies the subcarriage 26 and is formed as a hollow generally rectangular casting, provided with a forward extension 32. This extension terminates in downwardly-extending feet 33 which are apertured for pivotal engagement with trunnions 34. These trunnions are threaded through arms of an upstanding U-bracket 35 mounted on a front apron 36 of the subcarriage. Secured to the rearward end of the main carriage is a stud 37 on which there is journaled a roller 38. The roller rides on a horizontal cross rod 39 carried by and projecting laterally from the bridge 14. Thus, the main carriage rides on the rod 39 at its rearward end and is hinged to and propelled by the subcarriage at its forward end.

A record 41 is mounted on a pair of cone pivots 42 on the rearward portion of the main carriage. These pivots are desirably threaded through the side wall of the carriage. This recorder has a stylus 43 at its forward end for engaging a record mounted on the turntable. Biasing force to exert substantial pressure on the recording stylus against the record is provided, partially by the weight of the recorder, and partially by a tension spring 44 connected between a tail piece 45 on the recorder and a tab 46 overhanging from the rear portion of the main carriage.

A reproducer 47 is mounted in the front portion of the main carriage for universal (lateral and vertical)

freedom of movement. Lateral movement is allowed for by the pivot pin 48, and vertical movement by the pivot pin 49. The reproducer has a stylus 51 at its rearward end for engaging the record under the influence of its own weight. In the normally centralized position of the reproducer, the stylus thereof engages the record a short trailing distance behind the recorder with respect to the direction of advance of the carriage.

The recorder and reproducer have laterally-extending pins 52 and 53 at their free end portions by which they may be lifted from the record. Lifting is done through a lever mechanism 54 mounted on the right wall of the main carriage and operable by a lift rod 55 that extends parallel to the path of travel of the carriage. This lift rod is mounted, for up and down movement, on parallel arms 56 and 57 which are secured to a shaft 58 journaled in the bridge 14.

The lever mechanism 54 is such that when the lift rod 55 is in a raised position, both the recorder and reproducer are withheld from the record, but when the lift rod is in intermediate position only the reproducer engages the record, and when the lift rod is in lowered position, both the reproducer and the recorder engage the record. In the last-mentioned position of the lift rod, however, the audio circuits of the machine are completed only with respect to the recorder. In view of these functions of the lift rod, the upper, intermediate, and lower position are herein termed its "neutral," "reproducing" and "recording" positions, respectively.

The lift rod 55 is subject to several different control means, each of which has only a one-way coupling thereto effective to raise or retain the lift rod in reproducing or neutral position, but ineffective to force a lowering of the rod. Only when each of these control means is positioned to permit lowering of the lift rod will the latter move to lowered position. Firstly, the lift rod has a one-way coupling with the record-clamping mechanism effective to raise it to neutral position as the record-clamping mechanism is released and to permit the lift rod to lower as the record-clamping mechanism is actuated. This one-way coupling comprises a side arm 59 on the record-clamping lever 19, the end portion of which here underlies the lift rod to raise the same as the record-clamping mechanism is released, and vice versa. Also, upon release of the lift rod from neutral position by the record-clamping mechanism, the same may be shifted between recording and reproducing positions by the record-reproduce control mechanism 61 operable by a control knob 62. This control knob has a unique mode of operation to control still other functions according to my invention as will appear.

The record reproduce control mechanism 61 is mounted on the left end portion of a bracket plate 63. This bracket plate is secured to the lower housing section 12 by suitable means, including a screw 64 received in a post 65 upstanding from said section. The bracket plate 63 has a vertical bearing 66 and a right-angled lug 67 depending therebelow and carrying a second vertical bearing 68 in line with the first bearing (Figure 2). These bearings support a shaft 69 for rotational and vertical translational movement. Onto the upper end of this shaft is secured the aforementioned control knob 62. When the shaft is in its downward position, called its "record" position, the control knob is disposed in a circular recess or well 77 of the upper housing member 11. This well is substantially larger in diameter than the knob to provide easy access to the latter by the hand, so that said knob can be raised to reproduce position as desired.

A grooved wheel 72 is secured, as by a pin (not shown), to the portion of the shaft 69 between the bearings 66 and 68. Positioned rearward of the machine from this grooved wheel is an arm 73 of a bail 74 pivoted on a horizontal pin 75 supported at its forward end in a depending front flange portion 76, of the bracket plate 63, and at its rearward end by the lug 67. Mounted on said arm 73 is a roller 77 which engages in the groove of said wheel 72 to cause the bail 74 to be rocked as the shaft 69 is raised and lowered. A pinion 70 is secured to the lower end portion of the shaft 69 for engagement with a rack (not shown) secured to the subcarriage 26, to make possible movement of the subcarriage, and the main carriage secured thereto, forwardly and backwardly through their path of travel, by rotation of the control knob 62 only when said knob is in its raised or reproduce position.

The bail has an arm 78 disposed forwardly of the arm 73 and carrying a pin 79 embraced between the tines of a fork 81 secured to a front-to-back-extending shaft 82. This shaft is journaled at its forward end in the flange 76 at its rearward end in the upstanding flange 83 of a bracket 84, secured to the lower housing section as by means of screws 85. Secured to the rearward end of the shaft 82, as by pin 80, is the hub 86 of a crank 87 carrying a stud 88 underlying the lift rod 55. It will, therefore, be seen that as the knob 62 is raised from record to reproduce position, the shaft 82 is turned counterclockwise as viewed in Figure 2 and the stud 88 raised to effect a lifting of the rod 55 to shift the mechanism from "recording" to "reproducing" condition.

The turntable 13 is driven in the direction of the arrow A from a driving spindle 89 journaled in a bearing 91 for engagement with a friction idler wheel 92. This idler wheel is urged by a tension spring 93 against the peripheral rim of the turntable and against a brake shoe 94 for holding the turntable against movement. The idler wheel 92 is journaled to a link 95 which in turn is pivoted to a two-armed double bearing control lever 96, itself pivoted on a stud 97, so that by turning the control lever the idler is moved from the brake shoe along the peripheral rim of the turntable into frictional engagement with the driving spindle.

In the present embodiment, this engagement is effected by a clutch electro-magnet 98 which is held by a bracket 99 above the lower housing section 12 and to which it may be secured as by screws 100. This bracket has pivoted thereto at 101 an armature 102 for the electro-magnet. This armature is connected to the lever 96 by means of a link 103, one end of which is pivoted to the armature, as at 104, and the other end of which is pivoted to the lever as at 105. Thus energization of the electro-magnet effects a clockwise turning of the lever 96, resulting in a driving engagement between the idler wheel 92 and the spindle 89 to cause rotation of the turntable 13.

Further, a precautionary means such as is described in the Dann Patent No. 2,524,561, dated October 3, 1950, and having common ownership with the present application, may be provided to prevent the lift rod 55 from moving down into lowered positions as the record clamp is engaged, unless a record disc is mounted on the turntable, such precautionary means, however, not being herein shown. However, here the lift rod 55 corresponds with the left hand end portion of the leg 104c of the restrictive lever 104 of said patent.

As stated in said patent, there may be associated with the clamping mechanism which includes the clamp 18, a lever for withholding the translating units from being lowered onto the record as the control lever, corresponding with the lever 59 of the present case, is actuated out of neutral position into its recording or reproducing position. This lever 59 may serve to withhold either translating unit from being lowered onto the turntable when there is no record thereon.

In the final position of the actuating movement of the record-clamping mechanism, however, the lever is released for downward movement. When so released, however, it may or may not be permitted to move downwardly, as in response to its weight, into ineffective position depending on whether or not a record is mounted on the turntable. When there is no record on the turntable as the record-clamping member 18 is actuated, the lever 59 may be locked in an effective position, as an incident to actuating the clamping mechanism while no record is on the turntable, to prevent either translating unit from being lowered onto the turntable.

Referring now to the wiring diagram of Figure 4, where the bold conductor lines show the signal circuit from the plate of the amplifier tube to ground, the reference character 107 represents, for example, an output tube of the amplifier. This tube receives a signal onto its grid 115 through a lead 108 and condenser 109. The plate 114 of the tube is connected through a lead 113 and the primary winding 112 of an output transformer 161 to a B power supply designated by a terminal 110 and a resistor 111 wherein the resistor represents the internal resistance of the power supply. A filter-condenser 111a is connected from the B supply to ground. The screen grid of the amplifier tube is connected directly to this B power supply through a lead 140. The tube may have a suppressor grid 116 connected directly to a cathode 117 by a lead 118. The cathode is connected to ground at 119 through a resistor 121. The lead 122 between the condenser 109 and the grid 115 is connected to ground at 123 through a resistor 124. When the clutch electromagnet 98 is energized to start the turntable 13, the armature 102 is operated to cause the pole of a switch 125 to be disengaged from a contact 126 and made with a contact 127. In Figure 4, the contact 126 is the upper one, but in Figure 1 it is the lower contact because of the reversal of the link 103 and armature 102 in Figure 4 as compared with the showing in Figure 1.

In Figure 4 the start-stop or "run" switch is designated 128. This switch has a pole grounded at 129 and connected by a lead 131 to one terminal of the clutch electromagnet 98, the other terminal of which is connected to a source of D. C. voltage designated by the terminal 132. When the circuit is in recording condition, as shown in Figure 4, the secondary winding 159 of the output transformer 161 is connected to the recorder 41 through a switch 133. This switch is shiftable counterclockwise as it appears in Figure 4 into a reproduce position wherein it connects the output winding 159 to a loudspeaker 134 or other device for reproducing the recorded dictation.

The signal device employed in accordance with my invention is suitably a neon discharge lamp 135. It is connected from a point 138 which is the junction of a pair of resistors described below, to ground, through a current-limiting resistance 139 which may typically be of the order of several tens of thousands of ohms in value, and through a switch 141 which is linked to the switch 133 (as indicated at 142) to be closed in record condition and opened in reproduce condition. The resistors whose junction is designated as 138 are 136 and 137, typically of such values as 150,000 ohms and 82,000 ohms respectively, the upper end of the former being connected to the B power supply 110—111 (whose D. C. potential may be approximately 170 volts above ground when the amplifier is energized), and the lower end of the latter being connected to the contact 127 of the switch 125, which contact is grounded only when the clutch electromagnet 98 is energized.

Since the switch 141 is closed when the circuit is in record condition, the lamp 135 is then capable of being lit. When the switch 141 is open, the circuit is broken and the lamp 135 is extinguished. The resistor 145 shunting the lamp is of high resistance, typically about 2 megohms, and is desirably employed in accordance with well-known teachings to avoid spurious lighting of the lamp when the switch 141 is open, if that switch or the wiring thereto were to have appreciable shunt leakage. I will now describe when and how the lamp 135 will light when the machine is in recording condition.

When the start-stop switch 128 is in the open position shown, the switch 125 is disengaged from the contact 127 to cause the voltage drop in the resistor 136 to be only that which occurs by reason of the flow of current through the series resistor 139 and lamp 135. Under these circumstances the lamp will receive sufficient voltage to be steadily illuminated.

When the switch 128 is closed, the clutch electromagnet 98 is operated to cause the switch 125 to make with the contact 127, the effect of which is to ground this contact at 146. Under these conditions, a substantial increase in the voltage drop occurs across the resistor 136 due to the current flow through this resistor and through the resistor 137 to ground. If the amplifier is energized at the same time, the voltage is reduced at the junction 138 to a value about 10 volts less than that required for maintaining a discharge to the lamp 135, with the result that the lamp is therefore extinguished. If, on the other hand, the amplifier is cold, the current drain on the B power supply 110—111 is less, with the result that the voltage of this power supply is then higher due to its internal resistance; this higher supply voltage causes the voltage at the junction 138 to be sufficient to prevent extinguishment of the lamp 135.

When the lamp 135 has been extinguished by closing the switch 128 while the amplifier 107 is energized, the voltage at the junction 138 is not only some 10 volts lower than the extinguishment voltage of the lamp 135, but also some 15 volts lower than the lamp's ignition voltage. By the employment of a condenser 143, typically of a capacity of .01 microfarad, connected from the plate 114 of the output tube 107 to the junction 138, there are superimposed, on the junction's D. C. potential and subject to some loss in said condenser 143, the positive peak signal portions appearing at the plate of said output tube. It is by this expedient that, during speech, the lamp is caused to light intermittently in response to the speech, to indicate that speech-representing oscillations are being applied to the recorder, and to also indicate their amplitude by the time-percentage and intensity of the intermittent illumination; in other words, to act as a modulation lamp.

As shown in Figure 2, the switch 133 is mounted on the lower wall of the lower housing member 12, as on the upstanding flange 147 of a bracket 148 secured to said housing section as by means of a screw 149. This switch comprises a center or movable contact member 151, a left contact member 152 and a right contact member 153. When the mechanism is in the record position illustrated in Figure 2, the center contact member 151 engages the left contact member 152, by virtue of the leftward position of a stud 154 projecting from the shaft 82. When, however, the control knob is raised to effect translational movement of the shaft 69, that is, move it axially, the shaft 82 is turned counterclockwise, as viewed in Figure 2, to disengage the contact member 151 and allow it to engage the right contact member 153, so that the mechanism is then in reproduce condition.

This counterclockwise movement of the shaft 82 effects a corresponding raising of the lift rod 55 by action of the stud 88 thereon. Such raising causes the insulating bushing 150 on the lift rod 55 to push up on the switch member 141 to break its normal engagement with the contact 155, as shown in Figures 1, 3 and 4. As seen in these figures, the base of the switch 141 is separated from that of the contact 155 by insulation 156, desirably mounted on the right side of the bridge 14 as by means of screws or the like 157. Screws 158 serve to hold the upper and intermediate parts of the insulation 156 onto the lower part which is connected to the bridge 14, thereby holding the parts assembled with the switch bases sandwiched therebetween. Thus, the parts 82, 80, 86, 87, 88, 55 and 150 are an embodiment of the link between the switches 133 and 141, which is designated at 142 in Figure 4.

In the arrangement of Figure 4, the circuit through condenser 143, resistor 139 and signal lamp 135 is, during actual recording, shunted across the full output load of the amplifier tube 107, which load typically has a resistance of about 10,000 ohms as seen by the tube. The circuit is, of course, non-linear in the sense that it is an effective open circuit during more than half of each cycle, but has a very finite resistance during the balance of each cycle. Therefore, its presence in shunt with the output load tends to introduce distortion into the output from the amplifier. A corresponding distortion would appear in the recorder 41, as it is energized from the secondary winding 159 of the transformer 161, the primary winding 112 of which directly receives power from said amplifier.

By shunting this circuit through the signal lamp 135 across a part only of the output load; specifically by connecting the upper terminal of the condenser 143 to a tap, typically a midtap 162, on the primary winding 112 of the output transformer 161, instead of to the plate terminal or lead 113 to that winding, and compensating for the thus inherently-reduced excitation voltage of the lamp circuit by increasing its responsivity, specifically by reducing the value of the resistor 139, typically to about 10,000 ohms, this distortion is reduced to a negligible value. This modification is illustrated in Figure 5, in which the only changes are as indicated in this paragraph.

From the foregoing disclosure, it will be seen that I have devised a signal system for a machine adapted for recording and reproducing dictation in which a signal lamp, typically a neon discharge lamp, serves to give one of the following indications:

By steady illumination, (1) that the machine has been conditioned for recording (the "run" switch being unoperated);

By extinguishment (from a previous steadily illuminated condition) in response to the operation of the "run" switch, (2) that the amplifier is hot and (3) that the run switch has been properly operated to engage the clutch;

By intermittent illumination in response to the peaks of speech, (4) that amplified speech-representing oscillations are being applied to the recorder, their amplitude being indicated by the time-percentage and intensity of the intermittent illumination.

Having now described my invention in detail in accordance with the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. In a dictating machine including an audio circuit for sound-representing oscillations to be recorded, and a recording mechanism including a start-stop switch: the combination of an amplifier tube in said audio circuit; a B power supply for said amplifier tube having lower and higher voltage according to whether the said tube is heated or not; a signal device characterized as being operable by a voltage above a preset minimum value less than the minimum voltage of said B power supply; a circuit connected to said B supply for providing an operate voltage for said signal device whether said amplifier tube is heated or not; and means responsive to operation of said start-stop switch into start position for reducing the voltage supplied to said signal device to cause the signal device to be rendered inoperative when the amplifier tube is heated and operative when the amplifier tube is not heated.

2. The combination set forth in claim 1 including means for feeding said sound-representing oscillations from said audio circuit in superimposed relation to the D. C. voltage supplied to said signal device to cause the signal device to be operated intermittently by the peak voltages of said sound-representing oscillations when said start-stop switch is in start position and said amplifier tube is heated.

3. In a dictating machine including an audio circuit for sound-representing oscillations to be recorded, and a record-reproduce mechanism having a start-stop switch and a record-reproducing control; the combination of an amplifier stage in said audio circuit including an amplifier tube; a B power supply for said amplifier tube having a lower and higher voltage depending upon whether said amplifier tube is heated or not; a glow discharge tube operable by a voltage above a preset minimum value less than the minimum voltage of said B supply; circuit means for connecting said glow discharge tube across said B supply to provide an operative voltage to said glow discharge tube above said preset minimum value whether said amplifier tube is heated or not; means controlled by said record-reproduce control for removing operative voltage from said glow discharge tube when said record-reproduce mechanism is in reproduce condition; means rendered operative during recording as said start-stop switch is moved to start position while said record-reproduce mechanism is in record condition and said amplifier tube is heated for reducing the voltage to said glow discharge tube from said B supply below said predetermined minimum value; and means operative during recording for feeding said oscillations from said audio circuit to said glow discharge tube in superimposed relation to the voltage supplied to the tube from said B supply to cause the tube to be flashed intermittently by the peak voltages of said oscillations whereby the tube operates as a volume level indicator.

4. In a dictating machine having an audio circuit for receiving sound-representing oscillations including an output amplifier tube and an output circuit therefrom, a source of direct current for energizing said tube, a signal device, a lead between one pole of said signal device and said output circuit and energizable from said source, a stop-start switch for controlling the operation of said machine, and means to apply a grounding connection to said lead for deenergizing said signal when the amplifier tube is energized and the stop-start switch closed, while maintaining said signal energized when the amplifier tube is deenergized or the stop-start switch is open.

5. The invention as defined in claim 4, in which there is a resistance interposed between the output circuit from the amplifier tube and one pole of the signal device.

6. The invention as defined in claim 4, including a circuit for feeding sound-representing oscillations from the output of said tube to said signal device in superimposed relation to the source of direct current provided for energizing said signal device to cause the signal device to be actuated intermittently by said oscillations according to the amplitude level thereof when the amplifier is energized and said stop-start switch is closed.

7. In a dictating machine having an audio circuit including an output amplifier tube and output circuit therefrom, a source of direct current for energizing said tube, means for placing said recorder in or out of engagement with a record and correspondingly selectively connecting said audio circuit for recording or reproducing, a signal device, a lead between one pole of said signal device and said output circuit and energizable from said source, means for deenergizing said signal device when the machine is conditioned for reproducing, a stop-start switch for controlling the operation of said machine, and a switch to apply a ground connection to said lead for deenergizing said signal device when the amplifier tube is energized and the stop-start switch closed, while maintaining said signal energized when the amplifier tube is deenergized or the stop-start switch is open.

8. The invention as defined in claim 7, in which there is a transformer in the output circuit, and one pole of said signal is connected to an intermediate point on its primary winding.

9. In a dictating machine having a movably-mounted support for a record, the combination of a carriage, a recorder and a reproducer mounted thereon, each mounted for movement into and out of engagement with such a record on said support, a loud-speaker, an audio circuit including an output amplifier tube having a plate and adapted for selective connection to said recorder and loud-speaker, a record-reproduce control member for selectively connecting said audio circuit to said recorder or said loud-speaker and placing said recorder in or out of engagement with the record, a single visual signal with one pole connected through a condenser to the output circuit from said amplifier tube and through a resistor to the junction between another connection with the output circuit from said amplifier tube to a source of direct current through a directly connected resistor, a switch for effecting the energization of said signal, means to effect a switch-opening when the machine is conditioned for reproducing, driving means for said support, an electromagnet for operating said driving means, an associated armature, a stop-start switch for controlling said electromagnet, and a switch with an element secured to said armature for grounding the connection between said signal and said source of direct current, to thereby deenergize said signal when the amplifier tube is energized and the stop-start switch closed, while maintaining said signal energized if the amplifier tube is deenergized, due to the then less than normal voltage drop through said directly connected resistor.

10. The invention as defined in claim 9, in which there is an output transformer in the output circuit from said amplifier tube, and the one pole of said signal is connected to an intermediate point on its primary winding.

11. In a recording system including an audio circuit for sound-representing electric oscillations to be recorded, and a recording mechanism comprising a start-stop switch; the combination of a discharge device in which a visible discharge is produced when voltage thereacross is raised to an ignition value and in which visible discharge is terminated when voltage thereacross is reduced to an extinction value slightly less than said ignition value; means connected to said device for applying thereacross a direct voltage, said means being effective when said switch is in stop position to apply a direct voltage greater than said ignition value; means responsive to said switch upon the throwing thereof to start position for reducing said applied direct voltage to less than said extinction value; and means also connected to said device and connected to said audio circuit for superimposing on said reduced direct voltage electric oscillations from said audio circuit, thereby to cause an intermittent discharge to be produced in said device by oscillation peaks of one direction.

12. The combination claimed in claim 11, further including means for alternatively conditioning the system for reproducing, and means responsive to said reproducing-conditioning means for extinguishing all visible discharge in said device.

13. In a recording system including an audio circuit for sound-representing electric oscillations to be recorded: the combination of a discharge device in which a visible discharge is produced when voltage thereacross is raised to an ignition value and in which visible discharge is terminated when the voltage thereacross is reduced to an extinction value slightly less than said ignition value; direct-current-conductive means connected to said device for applying thereacross a direct voltage of value slightly less than said extinction value; and oscillation-conductive means also connected to said device and connected to said audio circuit for superimposing on said applied direct voltage electric oscillations for said audio circuit thereby to cause an intermittent discharge to be produced in said device by oscillation peaks of one direction.

No references cited.